(12) United States Patent
Streltsov et al.

(10) Patent No.: US 10,394,347 B2
(45) Date of Patent: Aug. 27, 2019

(54) CURVING MECHANISM FOR A PORTABLE MOUSE

(71) Applicant: Dell Products L.P., Round Rock, TX (US)

(72) Inventors: Sergei Streltsov, London (GB); Sonny Lim, Erlangen (DE); Eng How Chng, Singapore (SG)

(73) Assignee: Dell Products L.P., Round Rock, TX (US)

( * ) Notice: Subject to any disclaimer, the term of this patent is extended or adjusted under 35 U.S.C. 154(b) by 178 days.

(21) Appl. No.: 15/604,208

(22) Filed: May 24, 2017

(65) Prior Publication Data

US 2018/0341345 A1    Nov. 29, 2018

(51) Int. Cl.
*G06F 3/0354*    (2013.01)
(52) U.S. Cl.
CPC ................. *G06F 3/03543* (2013.01)
(58) Field of Classification Search
CPC .................................................. G06F 3/03543
See application file for complete search history.

(56) References Cited

U.S. PATENT DOCUMENTS

| | | | | |
|---|---|---|---|---|
| 4,130,113 A * | 12/1978 | Graham | ............. | A61B 17/0293 600/224 |
| 6,970,156 B1 * | 11/2005 | Silverstein | .......... | G06F 3/03543 345/156 |
| 7,344,495 B2 * | 3/2008 | Ravikumar | ............ | A61B 17/02 600/219 |
| 8,619,032 B2 * | 12/2013 | Lee | ...................... | G06F 3/03543 345/163 |
| 9,807,893 B2 * | 10/2017 | Li | ........................ | G06F 1/1652 |
| 2006/0022943 A1 * | 2/2006 | Johnson | ................ | G06F 1/1616 345/157 |
| 2006/0176277 A1 * | 8/2006 | Daniel | .................. | G06F 3/0317 345/163 |
| 2010/0295786 A1 * | 11/2010 | Ai | ........................ | G06F 3/03543 345/163 |
| 2012/0169600 A1 * | 7/2012 | Ma | ....................... | G06F 3/03543 345/163 |
| 2012/0235911 A1 * | 9/2012 | Snyder | ................ | G06F 3/03541 345/163 |
| 2013/0027864 A1 * | 1/2013 | Wei | ........................ | G06F 1/169 361/679.08 |
| 2014/0114138 A1 * | 4/2014 | Fedorov | ............ | A61B 17/0206 600/233 |
| 2015/0070278 A1 * | 3/2015 | Rehn | ................... | G06F 3/03543 345/163 |
| 2016/0364020 A1 * | 12/2016 | Deng | .................. | G06F 3/03543 |

* cited by examiner

*Primary Examiner* — Amare Mengistu
*Assistant Examiner* — Crystal Mathews
(74) *Attorney, Agent, or Firm* — Baker Botts L.L.P.

(57) ABSTRACT

Systems and methods are disclosed for coupling portions of portable mouse. A portable mouse includes a main plate. The portable mouse also includes a first side plate and a second side plate coupled to the main plate, wherein the main plate is configured to bend from a flat position to a curved position when the first and second side plates are pulled away from the main plate.

18 Claims, 5 Drawing Sheets

CURVING MECHANISM FOR A PORTABLE MOUSE

TECHNICAL FIELD

This disclosure relates generally to peripherals for information handling systems and, more particularly, to a curving portable mouse.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Examples of information handling systems include portable information handling systems, such as, smart phones, tablet computers, notebook computers, media players, digital cameras, 2-in-1 tablet-laptop combination computers, wireless organizers, and/or combinations thereof. A portable information handling system may generally be any device that a user may carry for handheld use and that includes a processor.

Users of portable information handling systems seek peripheral devices to facilitate interaction and information input/output with the systems. Such peripheral devices should be portable so that they may be easily transported with the portable information handling system. However, users of portable peripheral devices often desire similar functionality and comfort offered by traditional peripheral devices. Thus, there is a need for functional and comfortable portable peripheral devices.

SUMMARY

In some embodiments, a portable mouse is disclosed that includes a main plate. The portable mouse also includes a first side plate and a second side plate coupled to the main plate, wherein the main plate is configured to bend from a flat position to a curved position when the first and second side plates are pulled away from the main plate.

In another embodiment, a method is disclosed that includes coupling a first side plate to a main plate. The method also includes coupling a second side plate to the main plate, wherein the main plate is configured to bend from a flat position to a curved position when the first and second side plates are pulled away from the main plate.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION

Figure 1:
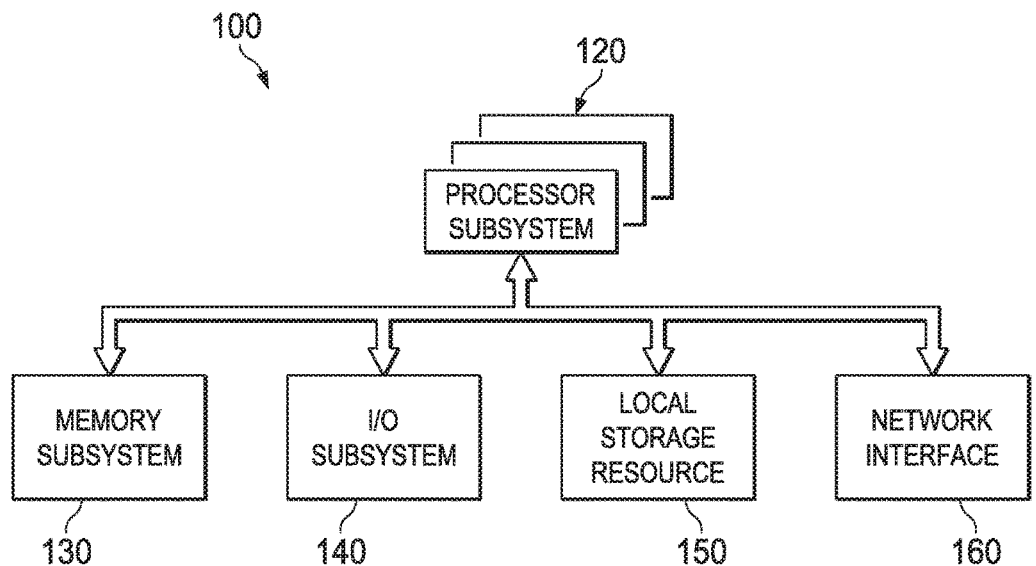
FIG. 1 illustrates a block diagram of selected elements of an embodiment of a portable information handling system.

In the following description, details are set forth by way of example to facilitate discussion of the disclosed subject matter. It should be apparent to a person of ordinary skill in the field, however, that the disclosed embodiments are exemplary and not exhaustive of all possible embodiments.

As used herein, a hyphenated form of a reference numeral refers to a specific instance of an element and the un-hyphenated form of the reference numeral refers to the collective or generic element. Thus, for example, widget "72-1" refers to an instance of a widget class, which may be referred to collectively as widgets "72" and any one of which may be referred to generically as a widget "72."

As noted previously, peripheral devices may help a user interact with a portable information handling system and/or facilitate the input and/or output of information to and from the system. A mouse is an exemplary peripheral device that assists a user with interacting with an information handling system. Movement of the mouse may move a pointer on the display of the information handling system, and clicking of a button may perform one or more additional operations on the information handling system. Although some portable information handling systems may include other means for interacting and communicating information to and from the system (e.g., a touch panel display or a trackpad), a user may nonetheless desire to use a peripheral portable mouse for convenience, functionality, familiarity, comfort, or other reasons.

In selecting a mouse, a user may desire a portable mouse that is easily transported with the portable information handling system. Similarly, a user may desire comparable comfort and functionality offered by a traditional mouse. As described in more detail below, a portable mouse may be designed to switch between a flat space-saving position and a curved active-usage position without sacrificing comfort or functionality.

For the purposes of this disclosure, an information handling system may include an instrumentality or an aggregate of instrumentalities operable to compute, classify, process, transmit, receive, retrieve, originate, switch, store, display, manifest, detect, record, reproduce, handle, or utilize various forms of information, intelligence, or data for business, scientific, control, entertainment, or other purposes. For example, an information handling system may be a server, a personal computer, a PDA, a consumer electronic device, a network storage device, or another suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

Particular embodiments are best understood by reference to FIGS. 1-5 wherein like numbers are used to indicate like and corresponding parts.

FIG. 1 illustrates a block diagram of selected elements of an embodiment of a portable information handling system 100 in accordance with some embodiments of the present disclosure. In various embodiments, portable information handling system 100 may represent different types of portable information handling systems, such as, smart phones, tablet computers, notebook computers, media players, digital cameras, 2-in-1 tablet-laptop combination computers, and wireless organizers. Components of portable information handling system 100 may include, but are not limited to, processor subsystem 120, which may comprise one or more processors, and system bus 121 that communicatively couples various system components to processor subsystem 120 including, for example, memory subsystem 130, I/O subsystem 140, local storage resource 150, and network interface 160.

Processor subsystem 120 may comprise a system, device, or apparatus operable to interpret and/or execute program instructions and/or process data, and may include a microprocessor, microcontroller, digital signal processor (DSP), application specific integrated circuit (ASIC), or another digital or analog circuitry configured to interpret and/or execute program instructions and/or process data. In some embodiments, processor subsystem 120 may interpret and/or execute program instructions and/or process data stored locally (e.g., in memory subsystem 130). In the same or alternative embodiments, processor subsystem 120 may interpret and/or execute program instructions and/or process data stored remotely (e.g., in a network storage resource, not shown).

System bus 121 may represent a variety of suitable types of bus structures, including for example, a memory bus, a peripheral bus, or a local bus using various bus architectures in selected embodiments. For example, such architectures may include, but are not limited to, Micro Channel Architecture (MCA) bus, Industry Standard Architecture (ISA) bus, Enhanced ISA (EISA) bus, PCI bus, PCI-E bus, Hyper-Transport (HT) bus, Integrated Interchip Sound (IIS) bus, Serial Peripheral Interface (SPI) bus, and Video Electronics Standards Association (VESA) local bus, among others. Although illustrated as a single bus in FIG. 1, system bus 121 may be implemented as a combination of one or more suitable busses, and in some embodiments, various components may use one or more different busses to communicate with other components of portable information handling system 100.

Memory subsystem 130 may comprise a system, device, or apparatus operable to retain and/or retrieve program instructions and/or data for a period of time (e.g., computer-readable media). Memory subsystem 130 may comprise random access memory (RAM), electrically erasable programmable read-only memory (EEPROM), a PCMCIA card, flash memory, magnetic storage, opto-magnetic storage, and/or a suitable selection and/or array of volatile or non-volatile memory that retains data after power to its associated information handling system, such as portable information handling system 100, is powered down.

In portable information handling system 100, I/O subsystem 140 may comprise a system, device, or apparatus generally operable to receive and/or transmit data to/from/within portable information handling system 100. I/O subsystem 140 may represent, for example, a variety of communication interfaces, graphics interfaces, video interfaces, user input interfaces, and/or peripheral interfaces. For example, I/O subsystem 140 may comprise a touch panel and display adapter. The touch panel (not expressly illustrated) may include circuitry for enabling touch functionality in conjunction with a display (not expressly illustrated) that is driven by display adapter (not expressly illustrated).

Local storage resource 150 may comprise computer-readable media (e.g., hard disk drive, floppy disk drive, CD-ROM, and/or other type of rotating storage media, flash memory, EEPROM, and/or another type of solid state storage media) and may be generally operable to store instructions and/or data. For example, local storage resource 150 may store executable code in the form of program files that may be loaded into memory 130 for execution. In addition to local storage resources 150, in some embodiments, portable information handling system 100 may communicatively couple via network 165 to a network storage resource (not expressly illustrated) using network interface 160.

Figure 2A:
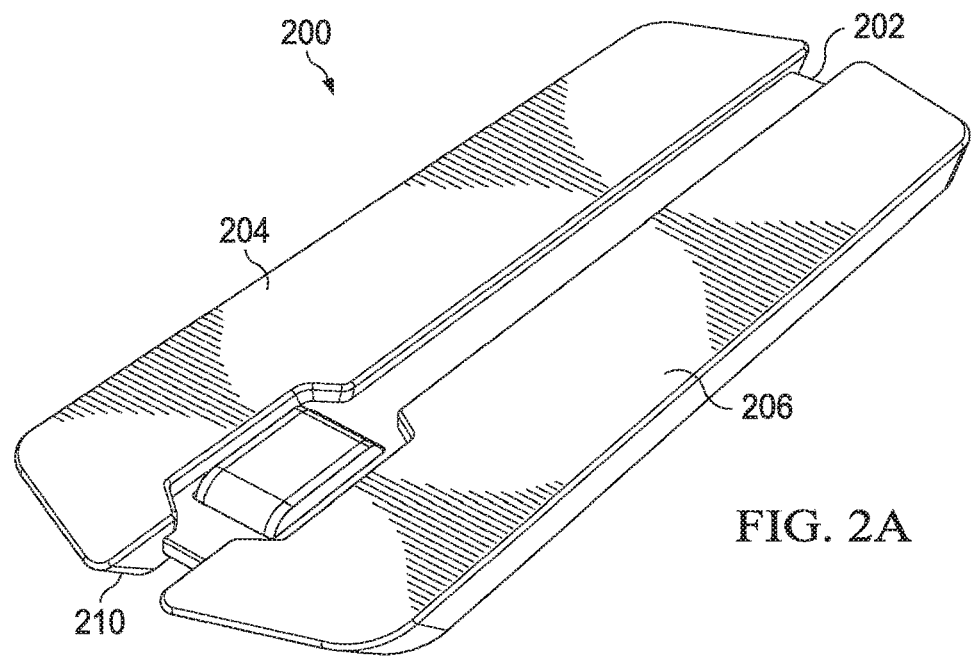
FIG. 2A illustrates a perspective view of a portable mouse in flat space-saving position.

FIG. 2A is a perspective view of a portable mouse in flat space-saving position. In the example embodiment, mouse 200 is comprised of a main plate 202 coupled to side plates 204 and 206. In space-saving position, plates 202, 204, and 206 may lay flat such that mouse 200 has a reduced thickness. Mouse 200 may easily stow into a pocket or bag in the space-saving position, making transportation of the device easier.

Figure 2B:
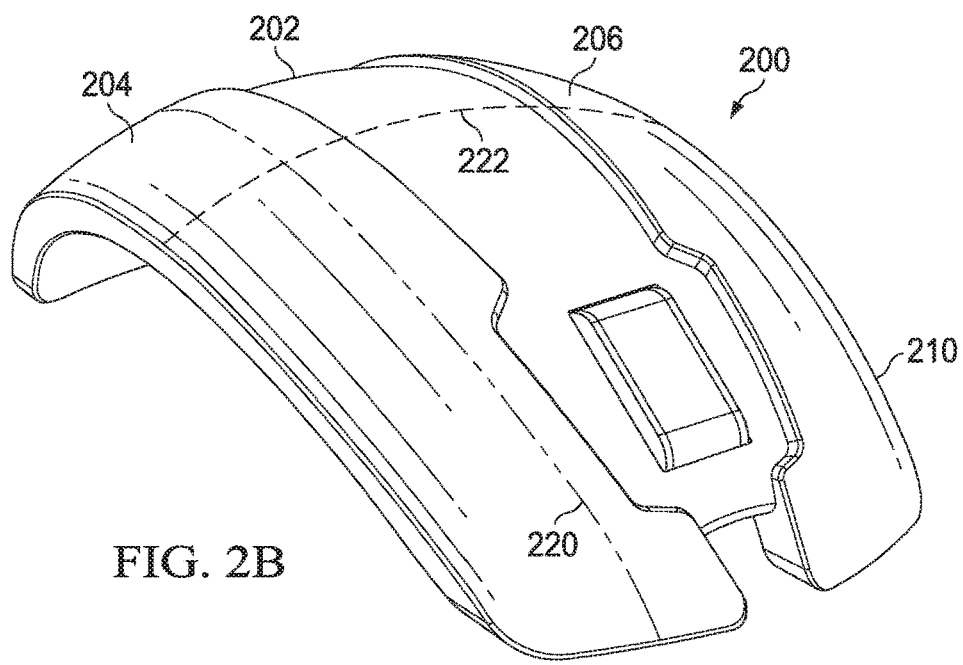
FIG. 2B illustrates a perspective view of a portable mouse in curved active-usages position.

FIG. 2B is a perspective view of a portable mouse in curved active-usage position. In active-usage position, side plates 204 and 206 may slide apart from each other such that the overall width of mouse 200 increases. The sliding apart of side plates 204 and 206 may cause mouse 200 to curve. For example, mouse 200 may curve lengthwise to form curve 220. Simultaneously, mouse 200 may curve widthwise to form curve 222. The curving of mouse 200 in two directions may conform the shape of the device to a user's hand, thereby improving the usability and comfort of mouse 200. The mechanical implementation details of mouse 200 are discussed in further detail below with the respect to FIGS. 3-4.

In active-usage position, a user may move mouse 200 in different directions to interact with the graphical user interface of the portable information handling system. Mouse 200 may include one or more elements for detecting such movements. For example, mouse 200 may include a light source (not expressly illustrated), such as a light emitting diode and/or a laser, and one or more photodetectors (not expressly illustrated), such as a photodiode. Movement of mouse 200 may be detected and measured based on the light emitted from the light source and the reflected light (e.g., light reflected off the surface on which mouse 200 is moved) detected by the photodetector. Mouse 200 may include a system or device (not expressly illustrated) to perform processing and/or calculations based on the light emitted and detected by mouse 200.

In addition to movement, mouse 200 may detect other forms of input from a user. For example, mouse 200 may include scroll sensor 210. Scroll sensor 210 may comprise a small rotating wheel, touch sensor, or another device that detects movement of a user's finger or other body part. Movement of a finger over scroll sensor 210 may enable a user to scroll and/or scan through content (e.g., documents, webpages, lists, etc.) on portable information handling system. In some embodiments, scroll sensor 210 may also function as a button such that additional input may be made by pressing scroll sensor 210 toward the body of the mouse. Although not expressly illustrated, mouse 200 may also include one or other buttons and/or sensors to enable input to the portable information handling system.

User input by movement of mouse 200, activation of scroll sensor 210, and/or other buttons and sensors of mouse 200 may be communicated to the information handling system. Mouse 200 may communicate with the information handling system in any suitable manner, including wired and wireless methods. For example, mouse 200 may use infrared radiation and/or radio signals to communicate information to/from the information handling system. In some embodiments, the information handling system may be equipped with a receiver to detect and process wireless signals from mouse 200. In other embodiments, a receiver may be coupled to the portable information handling system (e.g., via I/O subsystem 140 discussed above with respect to FIG. 1) to detect and process wireless signals from mouse 200, and communicate those signals to the information handling system.

In order to perform the functions described above, mouse 200 may require power. Thus, mouse 200 may include a power source, such as a battery (not expressly illustrated). The battery may be a single-use battery (e.g., alkaline) or a rechargeable battery (e.g., nickel cadmium, nickel-metal hydride, etc.). Mouse 200 may charge its battery via a charging cable coupled to another power source, such as a power outlet, another electronic device, or a dedicated charging device.

The electronic elements (e.g., sensors, power source, communication means, motion detection means, etc.) of mouse 200 may be placed at any suitable location within mouse 200. For example, one or more of the electronic elements may be stored in one or more electronics receptacles (not expressly illustrated). The electronics receptacle may be designed and located to minimize the thickness of mouse 200 in space-saving position. The electronics receptacle may couple to plates 202, 204, and/or 206 in a manner that does not interfere with movement and/or adjustment of plates when mouse 200 is moved between space-saving and active-usage positions. In some embodiments, an electronics receptacle may be placed near the front or rear end of mouse 200. In other embodiments, one or more electronic elements may be coupled directly to plates 202, 204, and/or 206 in any suitable manner. Placement and/or bundling of electronic elements may be based on functionality, safety considerations, size constraints, or other considerations. The design, selection, and placement of electronic elements may be made to minimize interference with the operation of mouse 200 (e.g., to prevent interference with the movement of plates 202, 204, and 206) and to minimize the dimensions of mouse 200 in space-saving position.

In some embodiments, one or more of plates 202, 204, and 206 may be covered in an elastic cover. The elastic cover may be comprised of a malleable material, such as an elastic thermoplastic, that compresses and/or stretches as mouse 200 is moved from space-saving position to active-usage position, and vice versa. In some embodiments, plates 202, 204, and 206 may be individually covered in an elastic cover. In other embodiments, plates 202, 204, and 206 may be covered in the same elastic cover.

Figure 3:
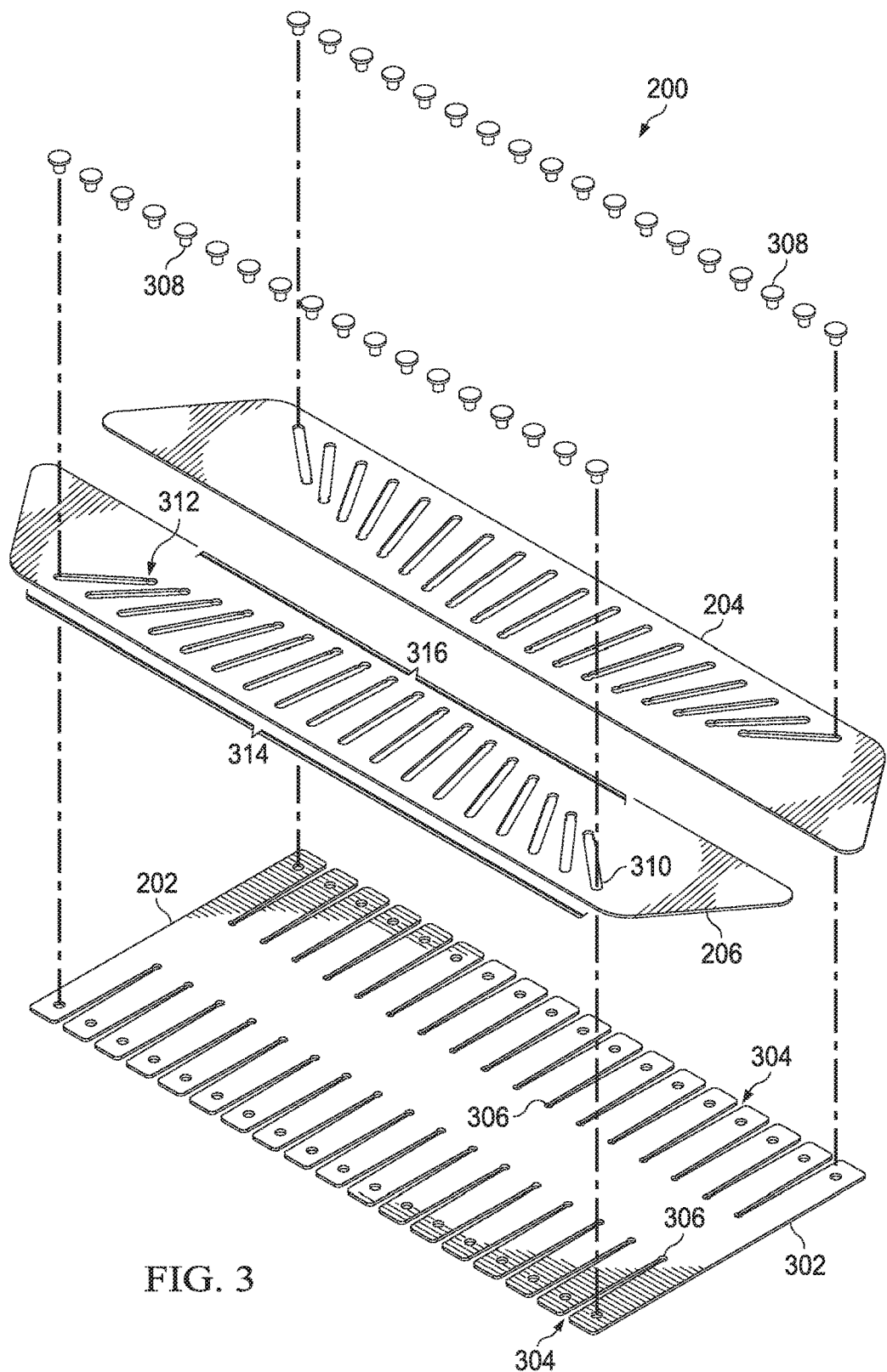
FIG. 3 illustrates a blown-up view of the mechanical elements of a curving portable mouse.

FIG. 3 illustrates a blown-up view of the mechanical elements of a curving portable mouse. As discussed above with respect to FIG. 2, mouse 200 may include main plate 202 and side plates 204 and 206. Plates 202, 204 and 206 may be comprised of a flexible material, including but not limited to steel, alloy steel, carbon fiber, polypropylene, and polyvinyl chloride (PVC). When force is applied, plates 202, 204 and 206 may bend or change shape, and when the force is removed, the plates may revert back to flat position.

Main plate 202 may include a plurality of fins 302 formed by slits 304. Slits 304 may extend from the lengthwise edge of main plate 202 toward the center of the plate. In some embodiments, slits 304 may be tapered such that each slit is wider at the edge of fins 302 (e.g., lengthwise edge of main plate 202) than it is at the opposite end of fin 302 located near the center of main plate 202. As discussed in more detail with respect to FIG. 4B, tapering fins 302 may facilitate the widthwise bending (e.g., as illustrated by curve 222 in FIG. 2) of mouse 200. In certain embodiments, one or more punch holes 306 may be cut in main plate 202 where fins 302 begin. That is, the part of fin 302 located near the center of main plate 202 may include a punch hole 306 to prevent or limit the enlargement of slits 304 caused by material fatigue resulting from repeated use mouse 200 (e.g., from space-saving position to active-usage position, and vice versa).

Side plates 204 and 206 may include a plurality of slots 310. Side plates 204 and 206 may couple to fins 302 of main plate 202 via one or more rivets 308. Rivets 308 may be comprised of any suitable material, including steel, brass, copper, aluminum, and/or a combination thereof. Each rivet 308 may extend through a slot 310 of side plate 204 or 206 and a fin 302 of main plate 202. Rivets 308 may couple the side plates to fins 302 of main plate 202. Rivets 308 may be designed or configured such that rivets 308 travel within slots 310 so that slide plates 204 and 206 may move in relation to main plate 202 and in relation to each other.

As illustrated in FIG. 3, slots 310 of side plates 204 and 206 may vary in length and angle. For example, slots 310 in the middle of side plates 204 and 206 may be longer than slots 310 located closer to either lengthwise end of the side plates. In addition, slots 310 in the middle of the side plates may be approximately perpendicular to the lengthwise edge of the side plates. However, slots 310 located further from the center slots may progressively angle inward toward the center perpendicular slots 310. Slots 310 at either end of side plates 204 and 206 may angle the most toward the center perpendicular slot. The angling of slots 310 results in the ends of slots 310 being closer together on the edge of the side plates that face the center of mouse 200 (e.g., spacing 316 is less than spacing 314). The angling of slots 310 may be used to control the curvature of mouse 200 in active-usage position. For example, increased angling of slots 310 may increase curvature of mouse 200 in active-usage position. As discussed below, the varying length and angle of slots 310 may cause mouse 200 to curve in two directions.

The number, size, and angle of slots 310 may be selected based on a functionality, lengthwise curve, widthwise curve, desired dimensions in active-usage mode, structural integrity of the materials, and/or other reasons.

As discussed above with respect to FIG. 2, one or more of plates 202, 204 and 206 may be covered in an elastic cover for user comfort, user safety, and to prevent objects and debris external to mouse 200 from interfering with the movement of the plates.

In one embodiment, the plates of mouse 200 are comprised spring steel; side plates 204 and 206 are approximately 140 millimeters (mm) long, 20 mm wide, and 0.2 mm thick; narrow spacing 316 for slots 310 is approximately 85 mm and wide spacing 314 is approximately 102 mm. However, the particular materials, dimensions, and components of mouse 200 may be selected based on cost, functionality, ergonomics, design, durability, and/or other factors. Although side plates 204 and 206 are shown above main plate 202 in FIG. 3, the order of the plates may be rearranged in different embodiments.

Figure 4A:
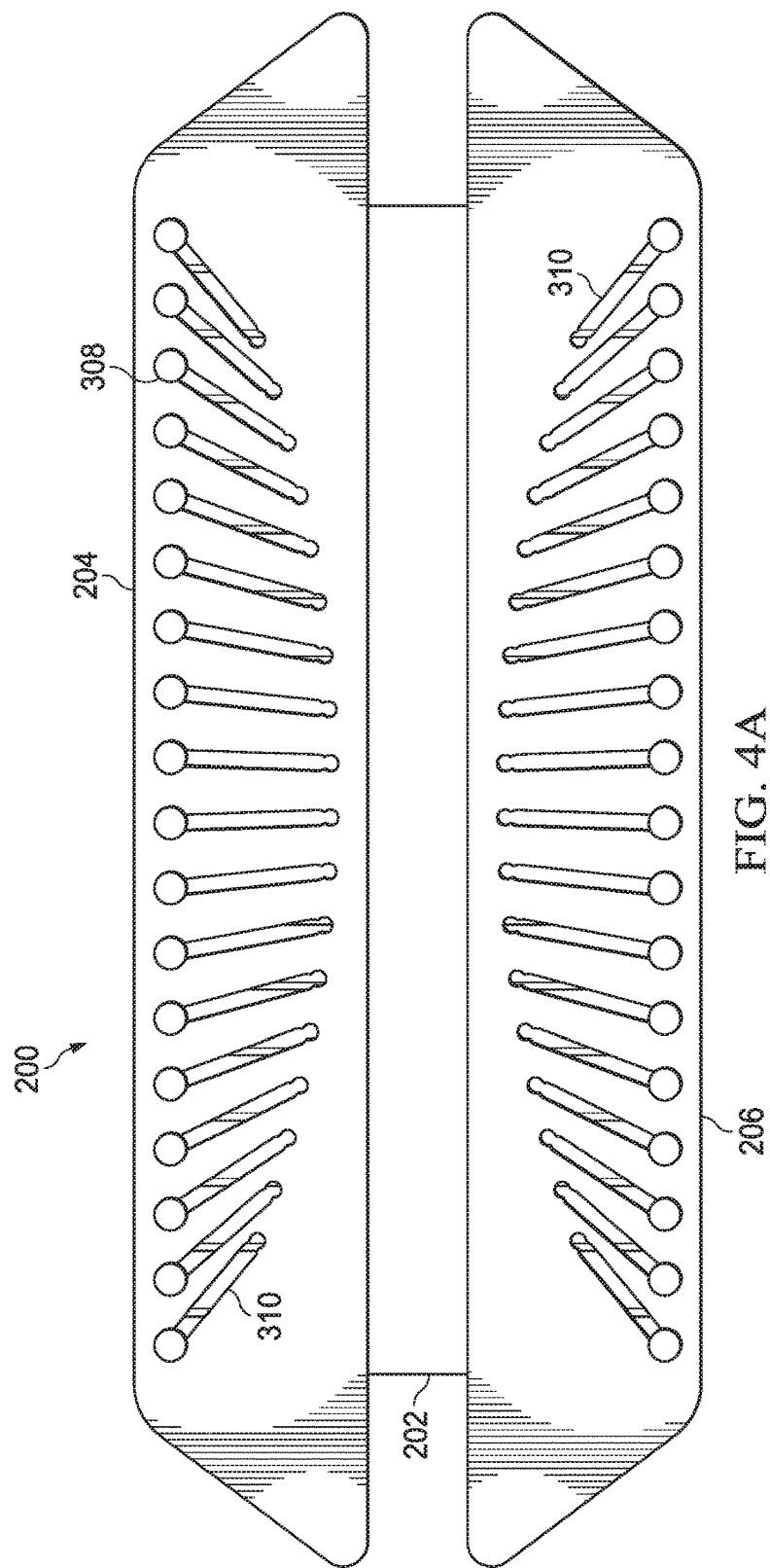
FIG. 4A illustrates a bottom view of the mechanical elements of a curving portable mouse in space-saving position.

FIG. 4A illustrates a bottom view of the mechanical elements of a curving portable mouse in space-saving position. To reduce the space footprint of mouse 200, side plates 204 and 206 are located closest to each other. Rivets 308 extend through slots 310 and fins 302 to couple side plates 204 and 206 to main plate 202. In space-saving position, side plates 204 and 206 may overlap with main plate 202 such that slots 310 align with the spacing of the fins on the main plate. Thus, side plates 204 and 206 may overlap in a flat position with main plate 202 when mouse 200 is in space-saving position.

Figure 4B:
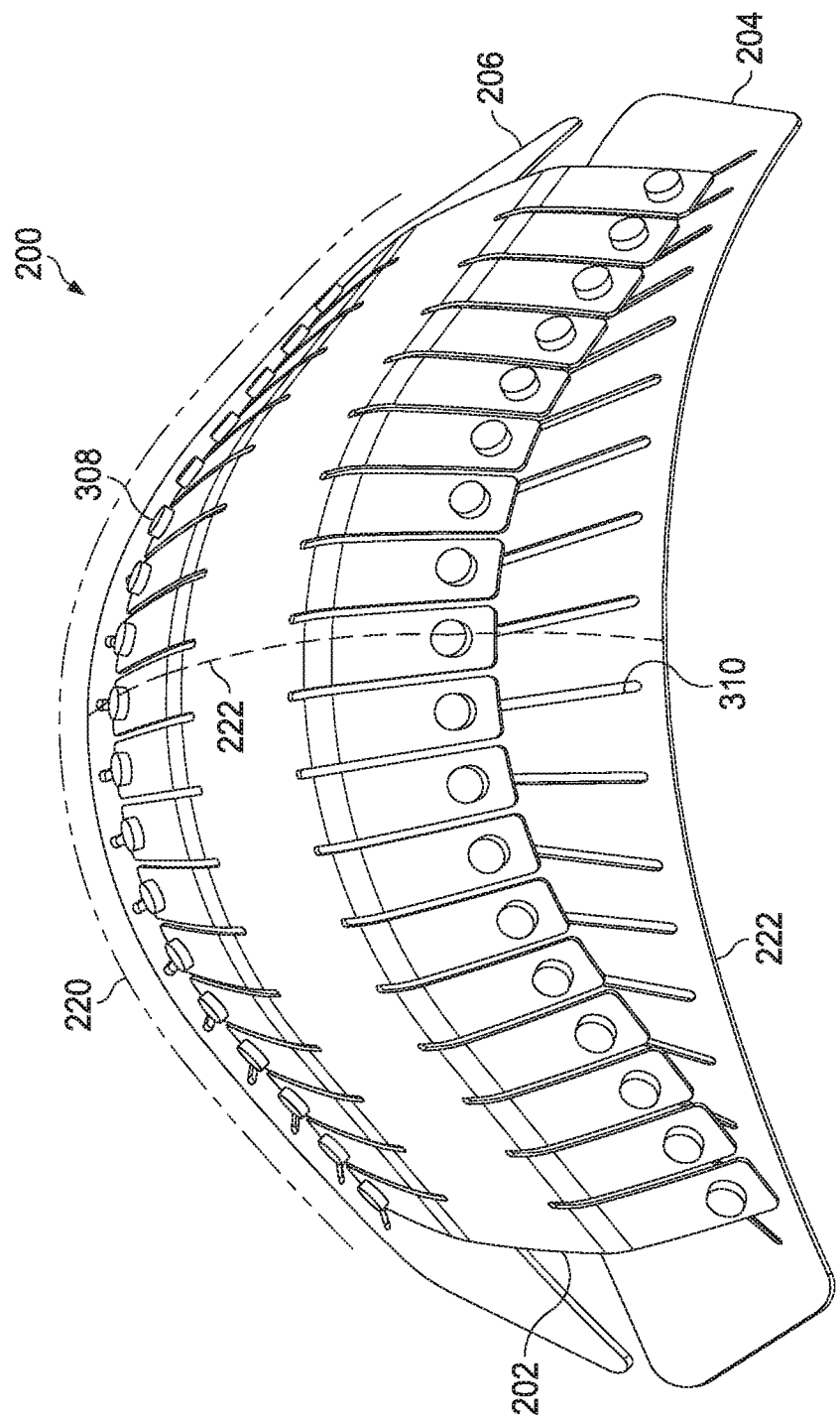
FIG. 4B illustrates a perspective view of the mechanical elements of a curving portable mouse in active-usage position.

However, as the side plates 204 and 206 are pulled apart from each other, main plate 202 may begin to curve. FIG. 4B illustrates a perspective view of the mechanical elements of a curving portable mouse in active-usage position. When side plate 204 or 206 is pulled away from main plate 202, slots 310 will guide the movement of rivets 308 such that the rivets are forced closer together. As rivets 308 move closer together, fins 302 may begin to bunch or pinch together and create a widthwise (e.g., curve 222) and a lengthwise curve (e.g., 220) to mouse 200. The increased length of slots 310 may allow side plates 204 and 206 to pull farther apart near the middle of mouse 200, which may enhance the widthwise curve and the width of the mouse. Slits 304 between fins 302 may facilitate movement of fins 302 by preventing the overlap or interference of fin material as fins 302 are brought closer together.

When a user is done using mouse 200, plates 204 and 206 may be pushed back towards each other to revert from active-usage position back to space-saving position. Again, slots 310 will guide the movement of rivets 308, allowing fins 302 to separate and relax back to their flat position. In this manner, plates 204 and 206 may be moved back and forth to cause mouse 200 to switch between active-usage position and space-saving position.

Mouse 200 may be designed to stay stable in active-usage position. As explained above, a user may pull side plates 204 and 206 apart from each other to transition from flat space-saving position to curved active-usage position. The tension and friction created between the plates, slots 310, and/or rivets 308 in active-usage position may prevent mouse 200 from reverting back to space-saving position until the user pushes side plates 204 and 206 back together. In addition, referring back to FIG. 3, slots 310 may include a small narrowing 312 to help hold mouse 200 in active-usage position. When side plates 204 and 206 are pulled to active-usage position, rivets 308 are pulled past narrowing 312 and the narrowing may "lock" the rivets into place, thereby helping to retain mouse 200 in active-usage position. When sufficient pressure is applied to push side plates 204 and 206 back together, rivets 308 may pass narrowing 312, allowing mouse 200 to revert back to flat space-saving position.

In some embodiments, mouse 200 may include an apparatus or device to assist with the transition to and from space-saving and active-usage positions. Mouse 200 may include a button or knob placed between side plates 204 and 206. Sliding, pushing, or turning the button or knob may manually push side plates 204 and 206 apart. In some embodiments, mouse 200 may include an activation assistance element to facilitate the transition of mouse 200 between positions. For example, one or more springs may be positioned within mouse 200 to pull or push side plates 204 and 206 apart when activated. Other devices or apparatuses may be included in mouse 200 to help users transition between space-saving position and active-usage position.

Figure 5:
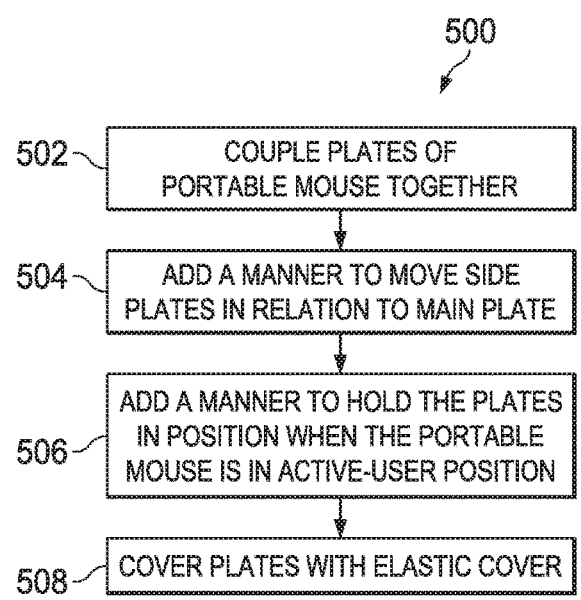
FIG. 5 illustrates a flowchart depicting selected elements of an embodiment of a method for coupling portions of a portable mouse.

FIG. 5 illustrates an example method 500 for coupling portions of a portable mouse. Method 500 may begin at step 502, where the plates of the portable mouse are coupled together. As described above with respect to FIGS. 2-4, a portable mouse may be comprised of a main plate and two side plates. Each side plate may be coupled to the main plate of the mouse such that the plates may be moved or slid in relation to each other. For example, one or more rivets may be placed through the slots of the side plates and affixed to the fins of the main plate.

In step 504, method 500 adds a manner for moving the side plates in relation to the main plate. The side plates may be moved apart manually (e.g., by the user pulling the side plates apart or a button or knob that forces the side plates apart) or automatically (e.g., by a spring-assisted mechanism that forces the side plates apart). The slots of the side plates may serve as a guide for the rivets as the plates are moved. As explained above with respect to FIGS. 4A and 4B, sliding the slide plates apart may cause the mouse to transition from a flat space-saving position to a curved active-usage position. Such curving may be caused by the angling of the slots in the side plates that cause the rivets and fins of the main play to bunch or pinch together. In active-usage position, the portable mouse may have to curves (e.g., curves 220 and 222 illustrated in FIG. 2).

In step 506, method 500 adds a manner for holding the plates in position when the portable mouse is in active-usage mode. The side plates, rivets, slots, and fins may be designed such that when the mouse is in active-usage mode, the friction or tension between the various parts causes the side plates to stay in place. In some embodiments, the slots in the side plates may have a narrowing (e.g., narrowing 312 in FIG. 3) that acts as a lock to hold the plates in place when the mouse is in active-usage mode. In some embodiments, the automatic mechanism of step 504 may help hold the side plates apart in active-usage mode.

In step 508, method 500 places an elastic cover the plates of the portable mouse. Individual elastic covers may be placed over the plates of the mouse. In some embodiments, a single elastic cover may be place over all of the plates of the mouse. The elastic cover may protect plates, slots, fins, and rivets from direct contact by objects and debris external to the portable mouse. The elastic cover may also improve user comfort and/or safety. After step 508, method 500 may end.

Method 500 may be implemented in any suitable manner. It is noted that certain steps or operations described in method 500 may be optional or may be rearranged in different embodiments.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, features, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A portable mouse comprising:
   a main plate including a first plurality of fins on a first lengthwise side of the main plate and a second plurality of fins on a second lengthwise side of the main plate;
   a first side plate and a second side plate coupled to the main plate, the first side plate including a plurality of slots, the plurality of slots slidably coupled to the first plurality of fins,
   wherein the main plate is configured to bend from a flat position to a curved position when the first and second side plates are pulled away from the main plate.

2. The portable mouse of claim 1, wherein the first plurality of fins are coupled to the first side plate and the second plurality of fins are coupled to the second side plate.

3. The portable mouse of claim 2, wherein the first and second plurality of fins are formed by slits in the main plate.

4. The portable mouse of claim 1, wherein the plurality of slots are slidably coupled to the first plurality of fins via a plurality of rivets, wherein the plurality of slots are configured to guide the plurality of rivets when the first side plate is moved.

5. The portable mouse of claim 1, wherein the plurality of slots are configured to overlap with the first plurality of fins when the fins are flat.

6. The portable mouse of claim 1, wherein a center slot of the plurality of slots is approximately perpendicular to a lengthwise edge of the first side plate, wherein the plurality of slots are progressively angled from the center slot outward, the plurality of slots configured to pull the first plurality of fins closer together when the first side plate is pulled away from the main plate.

7. The portable mouse of claim 6, wherein a lengthwise and a widthwise curve are formed when the first side plate is pulled away from the main plate.

8. The portable mouse of claim 1, wherein the main plate, the first side plate, and the second side plate are covered in a common elastic cover.

9. The portable mouse of claim 1, wherein the main plate, the first side plate, and the second side plate are covered in individual elastic covers.

10. A method of coupling portions of portable mouse comprising:
    coupling a first side plate to a main plate, wherein the main plate includes a first plurality of fins on a first lengthwise side of the main plate on a second plurality of fins on a second lengthwise side of the main plate;
    coupling a second side plate to the main plate, wherein the main plate is configured to bend from a flat position to a curved position when the first and second side plates are pulled away from the main plate,
    wherein the first side plate includes a plurality of slots, the plurality of slots slidably coupled to the first plurality of fins.

11. The method of claim 10, wherein the first plurality of fins are coupled to the first side plate and the second plurality of fins are coupled to the second side plate.

12. The method of claim 11, wherein the first and second plurality of fins are formed by slits in the main plate.

13. The method of claim 10, wherein the plurality of slots are slidably coupled to the first plurality of fins via a plurality of rivets, wherein the plurality of slots are configured to guide the plurality of rivets when the first side plate is moved.

14. The method of claim 10, wherein the plurality of slots are configured to overlap with the first plurality of fins when the fins are flat.

15. The method of claim 10, wherein a center slot of the plurality of slots is approximately perpendicular to a lengthwise edge of the first side plate, wherein the plurality of slots are progressively angled from the center slot outward, the plurality of slots configured to pull the first plurality of fins closer together when the first side plate is pulled away from the main plate.

16. The method of claim 15, wherein a lengthwise and a widthwise curve are formed when the first side plate is pulled away from the main plate.

17. The method of claim 10, wherein the main plate, the first side plate, and the second side plate are covered in a common elastic cover.

18. The method of claim 10, wherein the main plate, the first side plate, and the second side plate are covered in individual elastic covers.

* * * * *